United States Patent
Nagarathinam et al.

(10) Patent No.: US 11,605,121 B2
(45) Date of Patent: Mar. 14, 2023

(54) SYSTEMS AND METHODS FOR HANDLING ALTERNATE PICKUP USING VEHICLE RECOGNITION

(71) Applicant: Walmart Apollo, LLC, Bentonville, AR (US)

(72) Inventors: Arun Prasad Nagarathinam, Santa Clara, CA (US); Sahana Vijaykumar, Sunnyvale, CA (US); Madhavan Kandhadai Vasantham, Dublin, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/598,669

(22) Filed: Oct. 10, 2019

(65) Prior Publication Data

US 2020/0184541 A1 Jun. 11, 2020

Related U.S. Application Data (60) Provisional application No. 62/776,357, filed on Dec. 6, 2018.

(51) Int. Cl.
| | | |
|---|---|---|
| G06Q 30/06 | (2012.01) | |
| H04N 5/247 | (2006.01) | |
| G06Q 30/0601 | (2023.01) | |
| G06K 9/62 | (2022.01) | |
| G06V 10/22 | (2022.01) | |
| G06V 20/62 | (2022.01) | |

(52) U.S. Cl.
CPC ....... *G06Q 30/0635* (2013.01); *G06K 9/6201* (2013.01); *G06V 10/225* (2022.01); *H04N 5/247* (2013.01); *G06V 20/625* (2022.01); *G06V 2201/08* (2022.01)

(58) Field of Classification Search
CPC .... H04N 3/40; H04N 5/247; H04N 5/232411; G06Q 30/0635; G06K 9/6201; G06K 9/2063; G06K 2209/15; G06K 2209/23
USPC .............................. 382/105; 348/150; 705/13
See application file for complete search history.

(56) References Cited

U.S. PATENT DOCUMENTS

| | | | |
|---|---|---|---|
| 2007/0039030 A1* | 2/2007 | Romanowich ... | G08B 13/19608 348/E7.071 |
| 2013/0204719 A1* | 8/2013 | Burry ..................... | G06Q 50/12 705/15 |
| 2013/0216102 A1* | 8/2013 | Ryan ................... | G06Q 30/0281 382/105 |

* cited by examiner

*Primary Examiner* — Jeff A Burke
*Assistant Examiner* — Sihar A Karwan
(74) *Attorney, Agent, or Firm* — Morgan, Lewis & Bockius LLP; Manita Rawat (57) ABSTRACT

A method and system of handling an alternative pick-up using vehicle information is disclosed. Imaging data is received from at least one imaging device. The at least one imaging device is configured to provide a field-of-view of a predetermined area associated with a retail location. A vehicle identifier for each vehicle within the image data is extracted and compared to each user profile associated with an order in a set of orders. Each user profile includes a primary vehicle identifier and at least one secondary vehicle identifier and the extracted vehicle identifier is compared to the at least one secondary vehicle identifier in each user profile. The extracted vehicle identifier is associated with a first order in the set of orders when the extracted vehicle identifier matches the secondary vehicle identifier of the user profile of the first order.

15 Claims, 7 Drawing Sheets

SYSTEMS AND METHODS FOR HANDLING ALTERNATE PICKUP USING VEHICLE RECOGNITION

CROSS-REFERENCE TO RELATED APPLICATION

This application claims the benefit under 35 U.S.C. § 119(e) to U.S. Provisional Appl. Ser. No. 62/776,357, filed on Dec. 6, 2018, and entitled "SYSTEMS AND METHODS FOR HANDLING ALTERNATE PICK-UP USING VEHICLE RECOGNITION," which is incorporated by reference herein in its entirety.

TECHNICAL FIELD

This application relates generally to image recognition and, more particularly, relates to image recognition of one or more vehicle features.

BACKGROUND

In-store pick-up allows retailers having both online and brick-and-mortar locations to provide same-day availability of online products by directing an e-commerce customer to a brick-and-mortar location to pick-up one or more products for an order initiated on an online or other e-commerce interface. In some instances, a retailer can provide curbside pick-up which allows a customer to drive a vehicle to a designated area (such as one or more designated spots in a parking area) associated with the brick-and-mortar location. Once in the designated area, the customer identifies an order and the products in the order are delivered to the vehicle.

Although offering convenience, current curbside pick-up processes and systems fail to account for the frequent occurrence of an alternative vehicle picking up an order. For example, in homes including multiple vehicles, a first individual may place an order (and therefore be associated with the pick-up), while a second individual picks up the order in their own vehicle. Current curbside pick-up systems fail to account for alternative pick-up vehicles/individuals and result in inefficiencies and longer wait times.

SUMMARY

In various embodiments, a system is disclosed. The system includes a computing device configured to receive imaging data from at least one imaging device. The at least one imaging device is configured to provide a field-of-view of a predetermined area associated with a retail location. The computing device extracts a vehicle identifier from each vehicle within the image data and compares the extracted vehicle identifier to each user profile associated with an order in a set of orders. Each user profile includes a primary vehicle identifier and at least one secondary vehicle identifier and the extracted vehicle identifier is compared to the at least one secondary vehicle identifier in each user profile. The computing device associates the extracted vehicle identifier with a first order in the set of orders when the extracted vehicle identifier matches the secondary vehicle identifier of the user profile of the first order.

In various embodiments, a non-transitory computer readable medium having instructions stored thereon is disclosed. The instructions, when executed by a processor cause a device to perform operations including receiving imaging data from at least one imaging device configured to provide a field-of-view of a predetermined area associated with a retail location and extracting a vehicle identifier for each vehicle within the image data. The processor further causes the device to compare the extracted vehicle identifier to each user profile associated with at least one order in a set of orders associated with the retail location. Each user profile comprises a primary vehicle identifier and at least one secondary vehicle identifier. Each extracted vehicle identifier is compared to the at least one secondary vehicle identifier in at least one user. The extracted vehicle identifier is associated with a first order in the set of orders when the extracted vehicle identifier matches the at least one secondary vehicle identifier of the user profile of the first order.

In various embodiments, a method is disclosed. The method includes steps of receiving imaging data from at least one imaging device configured to provide a field-of-view of a predetermined area associated with a retail location and extracting a vehicle identifier for each vehicle within the image data. The extracted vehicle identifier is compared to each user profile associated with at least one order in a set of orders associated with the retail location. Each user profile comprises a primary vehicle identifier and at least one secondary vehicle identifier. Each extracted vehicle identifier is compared to the at least one secondary vehicle identifier in at least one user. The extracted vehicle identifier is associated with a first order in the set of orders when the extracted vehicle identifier matches the at least one secondary vehicle identifier of the user profile of the first order.

BRIEF DESCRIPTION OF THE DRAWINGS

The features and advantages will be more fully disclosed in, or rendered obvious by the following detailed description of the preferred embodiments, which are to be considered together with the accompanying drawings wherein like numbers refer to like parts and further wherein.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

In various embodiments, a system and method of identifying and handling an alternative pick-up vehicle, are disclosed. The method includes receiving an order from a user having a user profile associated therewith. The user profile includes a primary vehicle identifier and at least one secondary vehicle identifier. A vehicle recognition system processes image data from one or more imaging devices configured to provide at least a partial field-of-view of a designated area associated with a retail location. The vehicle recognition system is configured to extract vehicle identifiers for each vehicle in the image data. The vehicle identifiers are compared to the primary and secondary vehicle identifiers of the order. If a match is identified, the vehicle is identified as a pick-up vehicle for the order and the order is loaded into the vehicle. In some embodiments, if a match is not identified, the user profile is updated to include a vehicle identifier extracted from the image data.

Figure 1:
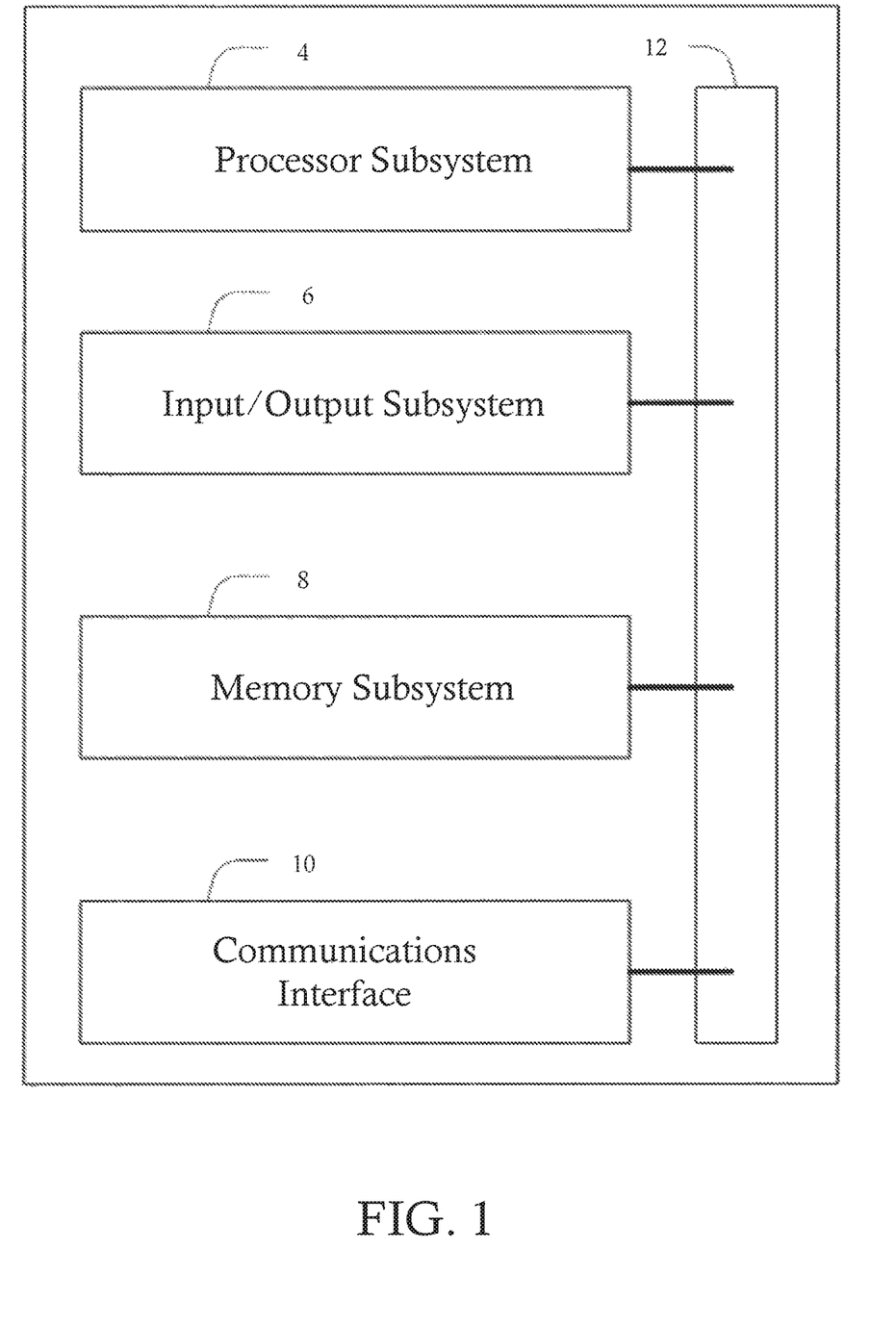
FIG. 1 illustrates a block diagram of a computer system, in accordance with some embodiments.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including A/B testing and cache optimization, as described herein. The instruction set may be stored in any acceptable form of machine readable instructions, including source code or various appropriate programming languages. Some examples of programming languages that may be used to store the instruction set comprise, but are not limited to: Java, C, C++, C #, Python, Objective-C, Visual Basic, or .NET programming. In some embodiments a compiler or interpreter is comprised to convert the instruction set into machine executable code for execution by the processing subsystem 4.

Figure 2:
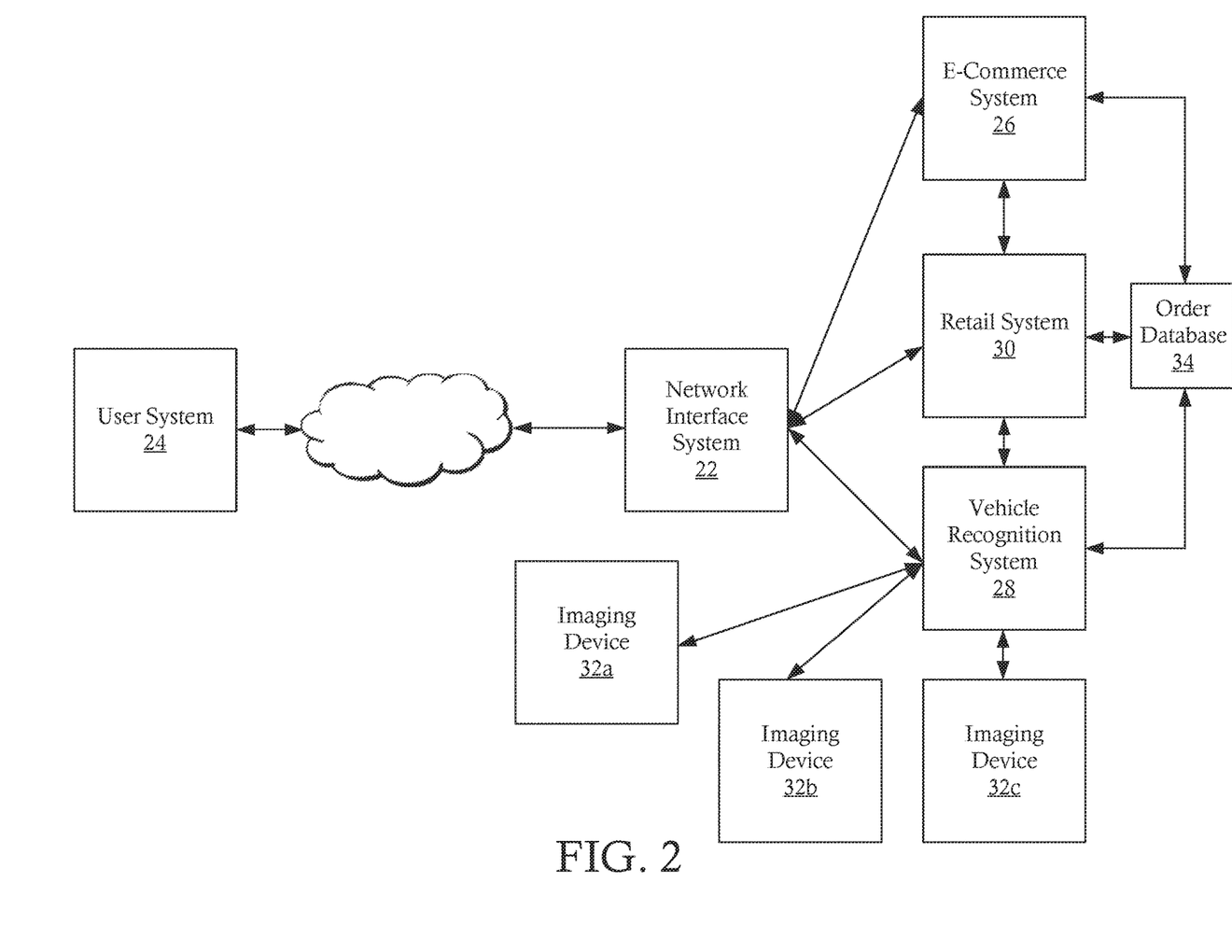
FIG. 2 illustrates a network configured to provide retail pick-up for e-commerce transactions, in accordance with some embodiments.

FIG. 2 illustrates a network 20 including a network interface system 22, a first user system 24, an e-commerce system 26, a vehicle recognition system 28, and a retail system 30. Each of the systems 22-30 can include a system 2 as described above with respect to FIG. 1, and similar description is not repeated herein. Although the systems are each illustrated as independent systems, it will be appreciated that each of the systems may be combined, separated, and/or integrated into one or more additional systems. For example, in some embodiments, network interface system 22, the ecommerce system 26, the vehicle recognition system 28, and/or the retail system 30 may be implemented by a shared server or shared network system. Similarly, the user system 24 may be integrated into additional user systems, such as a networked system or server in a user environment.

In some embodiments, the network interface system 22 is configured to provide a network interface to the user system 24. For example, in some embodiments, the network interface system 22 is configured to provide a webpage, web portal, and/or other network access interface to the user system 24. As one example, in some embodiments, the network interface system 22 is configured to provide a webpage having an e-commerce interface for identifying and purchasing one or more goods, although it will be appreciated that the disclosed systems and methods can be applied to any suitable network access interface provided via a network to one or more systems. In some embodiments, the network interface system 22 includes a front-end web-server, although it will be appreciated that the network interface system 22 can include any suitable front-end system.

In some embodiments, the e-commerce system 26 is configured to provide information regarding an e-commerce environment to the network interface system 22. The e-commerce information can include products, prices, store availability, and/or other information related to one or more products available through the e-commerce environment. In some embodiments, the e-commerce system 26 is configured to maintain a user profile associated with each user of the user system 24. For example, as discussed in greater detail below, the e-commerce system 26 may maintain a user profile for each user interacting with the e-commerce system 26 including, but not limited to, a user name, location, contact information, primary vehicle information, secondary vehicle information, preferred store, and/or any other suitable profile information.

In some embodiments, the e-commerce environment is configured to receive an e-commerce order from the user system 24 that includes at least one product designated for pick-up at a selected retail location. As used herein, the term retail location refers to any retail store, warehouse, and/or other brick-and-mortar location, self-service delivery location (e.g., pick-up locker, shared delivery space, etc.), and/or any other physical location at which a product ordered through an online e-commerce interface can be picked up. After receiving the order, the e-commerce system 26 is configured to provide order information, such as one or more product identifiers and a user profile (or user profile identifier) to the retail system 30 for preparation of the order. In some embodiments, the e-commerce system 26 also provides at least a portion of the user profile, such as primary and secondary vehicle identifiers associated with the user profile, to the vehicle recognition system 28.

In some embodiments, the retail system 30 receives the product identifiers, user profile, and/or additional information associated with the order. The retail system 30 adds the order to an order database 34 and the order is processed by one or more employees and/or an automated system within the retail location. The associates and/or automated system process the order by locating and packaging each of the identified products in the order and positioning (or staging) the packaged products in a staging area. In some embodiments, the retail system 30 is configured to update an order database 34 to indicate the order has been staged. In some embodiments, the retail system 30 is configured to process the order when a check-in or other notification is received indicating that an individual will be arriving at the retail location to pick-up the order.

In some embodiments, a vehicle recognition system 28 is configured to receive an image input (e.g., still images, dynamic images, etc.) from one or more imaging devices 32a-32c. The imaging devices 32a-32c can include any suitable image source, such as, for example, an analog camera, a digital camera having a charge-coupled device (CCD), a complementary metal-oxide semiconductor, or other digital image sensor, and/or any other suitable imaging source. The imaging devices 32a-32c can provide images in any suitable spectrum, such as, for example, a visible spectrum, infrared spectrum, etc. The image input may be provided by the imaging devices 32a-32c and/or received at the vehicle recognition system 28 in real-time and/or on a predetermined delay.

In some embodiments, and as discussed in greater detail below, the vehicle recognition system 28 is configured to implement one or more image recognition processes to identify one or more vehicles in the image input and extract at least one vehicle identifier for each vehicle. For example, and as discussed further below, the vehicle recognition system 28 may be configured to identify a license plate number for each vehicle in the image data. The vehicle recognition system 28 and/or the retail system 30 is configured to compare each vehicle identifier extracted from the image data to a primary and one or more secondary vehicle identifiers of each user profile associated with an order in the order database 34, as discussed in greater detail below. When a match is identified, the retail system 30 notifies the employee and/or automated system of the retail location to retrieve the order from the staging area and deliver the order to the vehicle associated with the matched vehicle identifier.

Figure 3:
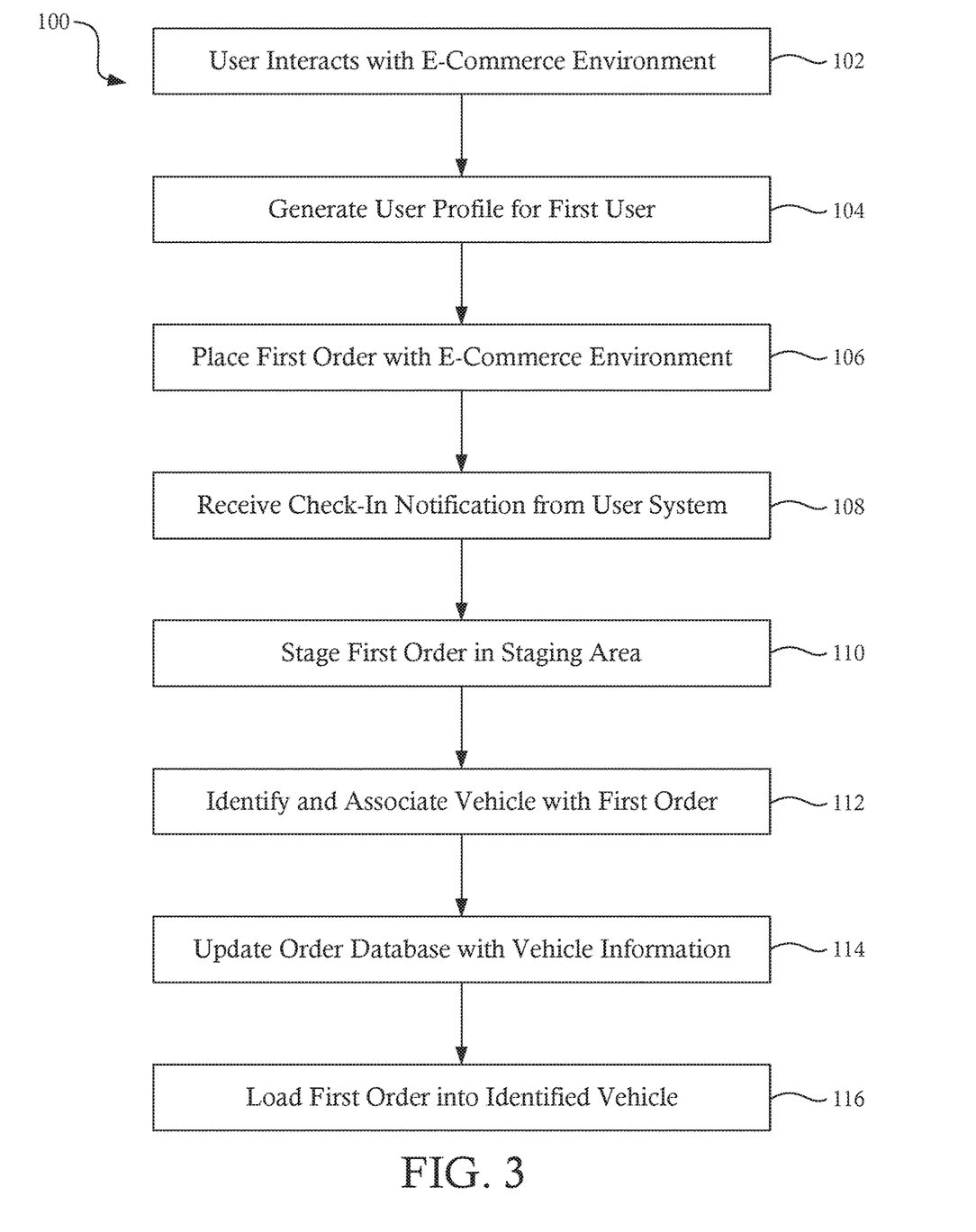
FIG. 3 is a flowchart illustrating a method of receiving and processing an e-commerce order including at least one product designated for pick-up, in accordance with some embodiments.
Figure 4:
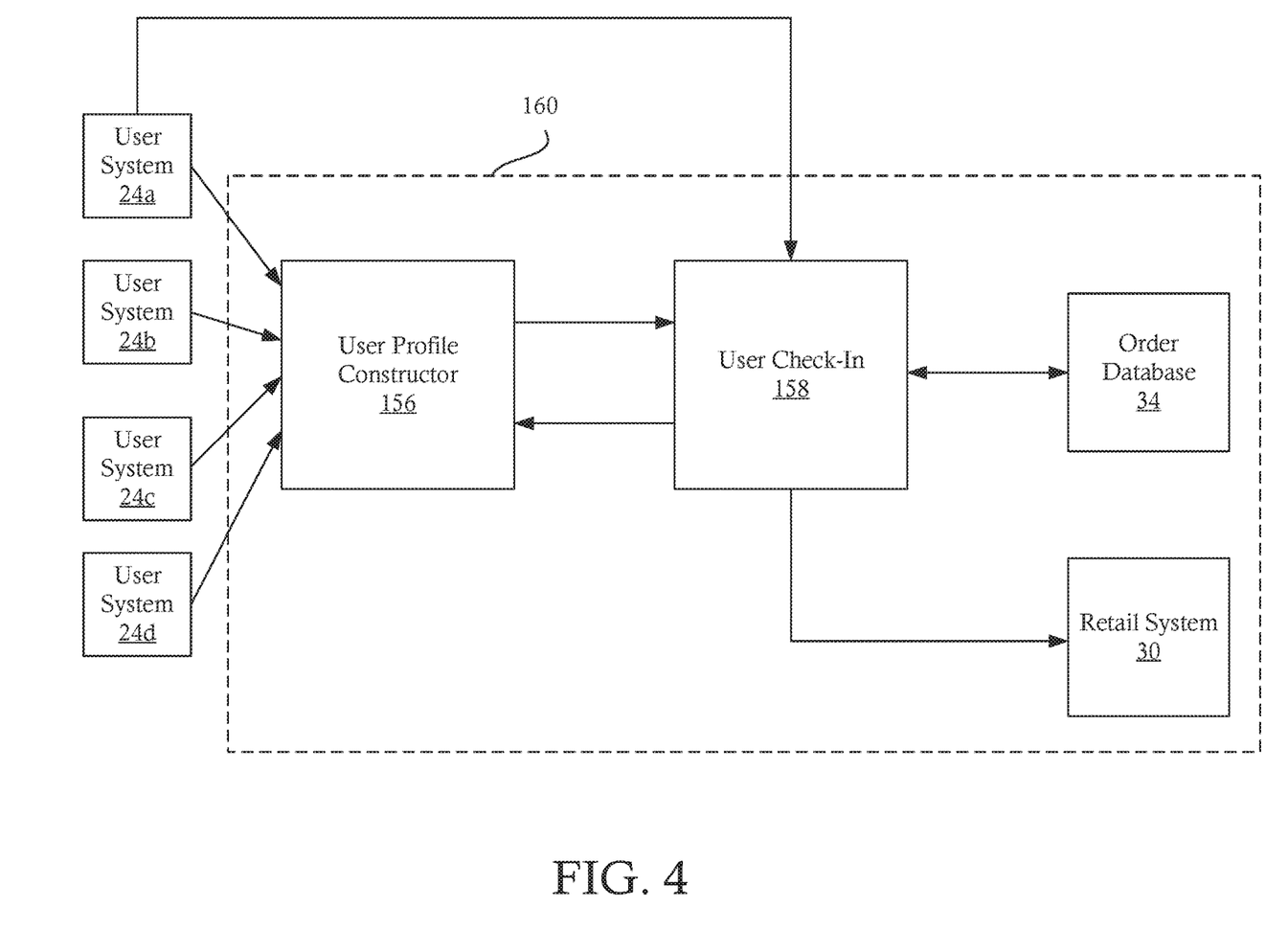
FIG. 4 is a system diagram illustrating various system elements during execution of the method of receiving and processing an e-commerce order illustrated in FIG. 3, in accordance with some embodiments.

FIG. 3 is a flowchart illustrating a method 100 of receiving and processing an e-commerce order including at least one product designated for pick-up, in accordance with some embodiments. FIG. 4 is a system diagram 150 illustrating various system elements during execution of the method 100 of receiving and processing an e-commerce order illustrated in FIG. 3, in accordance with some embodiments. At step 102, a first user interacts with an e-commerce environment 160 using one of a plurality of user systems 24a-24d. Each of the user systems 24a-24d has a user associated therewith and is in signal communication with, for example, the network interface system 22 (see FIG. 2).

At step 104, the e-commerce environment 160 implements a user profile constructor 156 to generate a user profile for the first user. A user profile can include user identification information such as, for example, name, location, address, contact information, user name, etc. The user profile may further include a default pick-up location designation, a primary vehicle identifier, one or more secondary vehicle identifiers, and/or any other suitable information.

In various embodiments, the primary and/or secondary vehicle identifiers can include, but are not limited to, a value assigned by a vehicle manufacture (e.g., a VIN number), a value assigned by a government or regulatory body (e.g., a license plate number), a value assigned by the entity associated with the e-commerce environment (e.g., a QR code or barcode assigned by a retailer), and/or any other suitable vehicle identifier. In some embodiments, one or more non-unique vehicle identifiers, such as, for example, make, model, year, color, etc., may be considered in aggregate to uniquely identify a vehicle. In the illustrated embodiment, the vehicle identifier includes a vehicle registration number (e.g., a license plate number).

At step 106, the first user places a first order through the e-commerce interface 160. The first order includes at least one product designated for pick-up at a selected retail location. The at least one product can include any suitable products, such as, for example, retail goods (e.g., groceries, individual products, etc.), commodity goods (e.g., bulk orders, trade goods, etc.), and/or any other suitable product. The first order is associated with the user profile of the first user.

At step 108, a check-in process 158 receives a check-in notification from a system associated with the first user. The system that generates the check-in notification can be the same user device 24a used to place the first order and/or a second user system associated with the first user. The check-in process 158 notifies a retail system 30 of the retail location that an order has been designated for pick-up, e.g., a person will be arriving at the retail location to pick-up the product(s) in the first order. In some embodiments, the check-in process 158 generates an estimated time of arrival (ETA) associated with the first order. For example, in some embodiments, the check-in process 158 calculates an ETA for an individual departing from the location of the user device 24a and arriving at the retail location. The ETA may be generated using user location data, user tracking data, traffic data, and/or other relevant data.

At step 110, the first order is staged in a staging area of the retail location. In some embodiments, the check-in process 158 adds the first order to an order database 34. When the first order is added to the order database 34, the retail system 30 instructs an employee and/or automated system at the retail location to identify, package, and position the product(s) in the first order in the staging area. Positioning of orders in the staging area allows quick and efficient delivery to a vehicle when a person arrives to pick-up the order. For example, in some embodiments, the order staging area may be located near a loading dock and/or other designated loading area in a parking area associated with the retail location. In other embodiments, the staging area may include a storage area maintained by an automatic storage and/or retrieval system.

In some embodiments, the first user will arrive at the retail location in a primary vehicle designated in the user profile to pick-up the order. The location of the first user may be monitored based on location data of a user device 24a associated with the first user, for example, a wireless device such as a cell phone, etc. In other embodiments, the location of the first user may be estimated based on location data generated during the check-in at step 108 and based on traffic, mapping, and/or other data. As discussed below, when the first user arrives at the retail location, the e-commerce environment 160 can detect the arrival and can instruct an employee and/or automated system to provide the order to the first user (i.e., the primary vehicle) to complete the pick-up transaction. However, in some instances, instead of going to the retail location themselves, the first user can designate or task a second individual to pick-up the order. In such instances, the e-commerce environment 160 may not be aware of the location or status of the second individual until the second individual arrives at the designated pick-up location and provides an order identifier for the order. In such instances, the time devoted to a single order is increased. An employee and/or automated system must interact with the second individual to identify the order, retrieve the order from the staging area, and load the order while the individual waits in the designated pick-up area, requiring additional employee/system time and preventing others from picking up orders during this period.

In some embodiments, to reduce wait times and increase efficient use of employee/system time, at step 112, a vehicle recognition system 28 is configured to identify and associate a vehicle with an open order when the vehicle enters a designated area. In various embodiments, the vehicle can include a primary vehicle, a secondary vehicle, and/or an unmatched vehicle. As used herein, the term primary vehicle refers to a vehicle having a vehicle identifier matching a primary vehicle identifier in the user profile of the user associated with an order (e.g., the first user), the term secondary vehicle refers to a vehicle having a vehicle identifier matching a secondary vehicle identifier in the user profile, and the term unmatched vehicle refers to a vehicle not associated with an open order. In some embodiments, the primary and/or secondary vehicle identifiers can be designated by a user (e.g., the first user) during a user profile generation process, a vehicle associated with the user profile by the retail system 30 (discussed in greater detail with respect to FIG. 7), and/or any other vehicle.

As discussed in greater detail below, the vehicle recognition system 28 is configured to receive image data from one or more imaging devices positioned to provide at least a partial field-of-view of the predetermined area, such as a parking area associated with the retail location. In some embodiments, the vehicle recognition system 28 is configured to identify each vehicle in the image data and extract at least one vehicle identifier for each vehicle. For example, in some embodiments, the vehicle recognition system 28 includes an automated license plate recognition (ALPR) system configured to detect and identify a license plate for each vehicle within the predetermined area.

In some embodiments, the vehicle recognition system 28 is configured to compare each vehicle identifier extracted from the image data to each order in the order database. For example, a first vehicle having a first vehicle identifier may enter the predetermined area. The e-commerce environment 160 detects the first vehicle and extracts the first vehicle identifier. The vehicle identifier is compared to the open orders maintained by the e-commerce environment 160. A first order associated with a first user profile including the first vehicle as a primary vehicle is identified and the first order is designated for the first vehicle. In some embodiments, after associating a vehicle identifier with the first order, the vehicle recognition system 28 may review additional orders in the order database and identify a second order including a user profile with a match between the vehicle identifier and a secondary vehicle identifier. The vehicle recognition system 28 may associate the identified vehicle with each order in the order database having a primary and/or secondary vehicle identifier that matches the vehicle identifier extracted from the image data.

At step 114, the vehicle recognition system 28 updates the order database 34 to indicate that a vehicle associated with the first order is located in the designated area. In some embodiments, the order database 34 is maintained by and/or integrally formed with the retail system 30. In other embodiments, the order database 34 is maintained by the vehicle recognition system 28. At step 116, an employee and/or automated system retrieves and delivers the first order (and any additional orders associated with the vehicle identifier) to the vehicle. For example, in some embodiments, the employee and/or automated system retrieves the order from the staging area and delivers the order to the vehicle without the driver of the vehicle needing to exit their vehicle or provide any identifying information to the retail location to complete the order.

Figure 5:
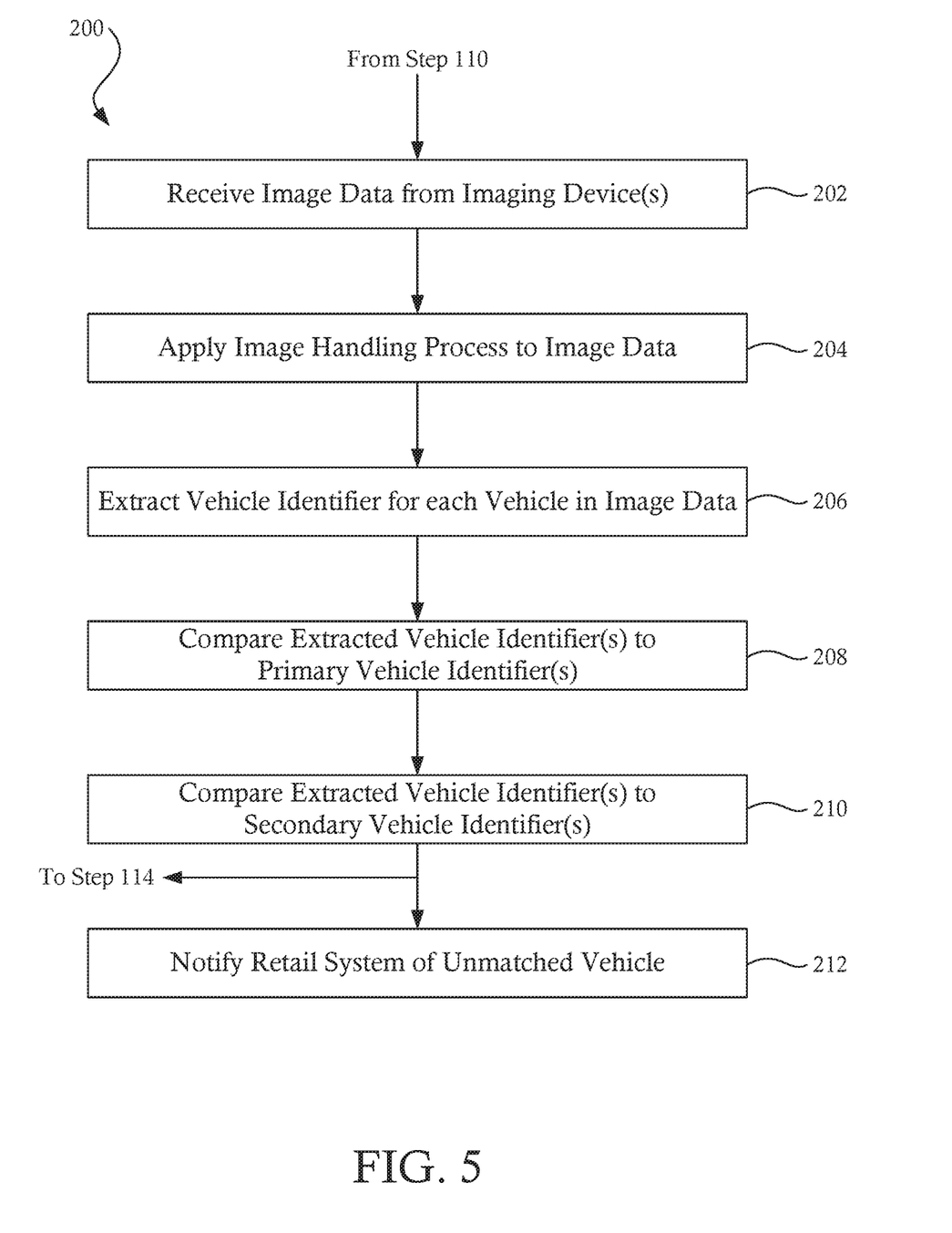
FIG. 5 is a flowchart illustrating a method of identifying a secondary vehicle in a predetermined area, in accordance with some embodiments.
Figure 6:
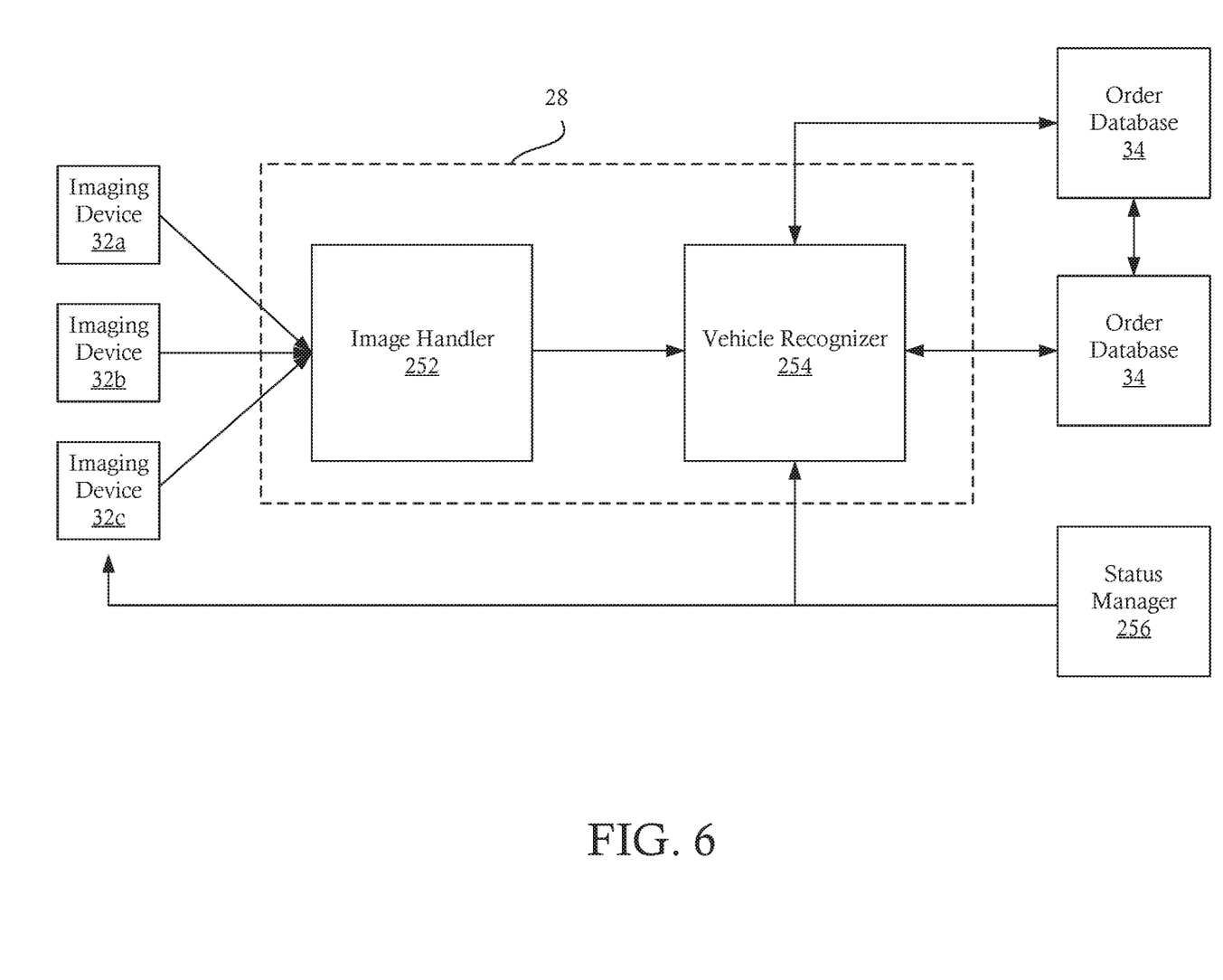
FIG. 6 is a system diagram illustrating various system elements during execution of the method of identifying a secondary vehicle in a predetermined area illustrated in FIG. 5, in accordance with some embodiments.

FIG. 5 illustrates a method 200 of identifying a pick-up vehicle, in accordance with some embodiments. FIG. 6 illustrates a system flow 250 of the method 200, in accordance with some embodiments. The method 200 may be implemented by a vehicle recognition system 28 during one or more steps of the method 100 discussed above, for example, at step 112 of method 100. At step 202, a vehicle identification system 28 receives image data from one or more imaging devices 32a-32c, such as, for example, one or more digital cameras configured to provide at least a partial field-of-view of a parking area associated with a retail location. In some embodiments, a plurality of imaging devices 32a-32c are positioned to provide at least partially overlapping field-of-view for the parking area. In some embodiments, the imaging devices 32a-32c are positioned to capture only a predetermined portion of a parking area, such as, for example, one or more designated pick-up spots in the parking area.

At step 204, the vehicle identification system 28 implements an image handler 252 configured to digitally process the image data obtained by the imaging devices 32a-32c. The image handler 252 can apply any suitable image handling algorithm, process, and/or other image handling procedure to modify, enhance, and/or otherwise process the image data received from the imaging devices 32a-32c prior to performing vehicle identification.

At step 206, the vehicle identification system 28 implements a vehicle recognize 254 to identify a vehicle identifier for each vehicle within the image data and/or a predetermined portion of the image data. The vehicle recognizer 254 extracts at least one vehicle identifier for each vehicle. For example, in various embodiments, the at least one vehicle identifier can include, but is not limited to a value assigned by a vehicle manufacture (e.g., a VIN number), a value assigned by a government body such as a vehicle registration value (e.g., a license plate number), a value assigned by the entity associated with the e-commerce system 26 (e.g., a QR code or barcode assigned by a retailer), and/or any other suitable vehicle identifier. In some embodiments, one or more non-unique vehicle identifiers, such as, for example, make, model, year, color, etc., may be considered in aggregate to uniquely identify a vehicle. In the illustrated embodiment, the vehicle recognizer 254 includes an automated license plate recognition process configured to identify and extract a license plate number for each vehicle in the image data.

At step 208, each extracted vehicle identifier is compared to the primary vehicle identifier for each order in the order database 34. As discussed above, when a user interacts with the e-commerce system 26, the user establishes a user profile that includes, among other information, a primary vehicle identifier. In some embodiments, the vehicle identification system 28 searches and/or directly compares the extracted vehicle identifier with each primary vehicle identifier for each user profile associated with an order in the order database. In other embodiments, the vehicle identification system 28 provides each extracted vehicle identifier to a second system, such as the retail system 30, which compares the extracted vehicle identifier to primary vehicle identifiers for each user profile associated with an order. In some embodiments, if an extracted vehicle identifier vehicle matches a primary vehicle identifier of a user profile associated with an order in the order database, the method 200 proceeds to step 212 and if the extracted vehicle identifier does not match a primary vehicle identifier, the method 300 proceeds to step 210. In some embodiments, the method 200 proceeds to step 210 regardless of whether a match is identified for a primary vehicle identifier.

At step 210, the extracted vehicle identifier is compared to the secondary vehicle identifier(s) for each order in the order database. For example, as discussed above, a user may provide one or more secondary vehicle identifiers during a user profile creation process. Similarly, and as discussed below, a secondary vehicle identifier may be added to a user profile when a vehicle is used to pick-up a predetermined number of orders placed by a first user associated with the user profile. In some embodiments, the vehicle identification system 28 searches and/or directly compares each extracted vehicle identifier with secondary vehicle identifiers associated with each order in the order database. In other embodiments, the vehicle identification system 28 provides the extracted vehicle identifier to a second system, such as the retail system 30, which compares the extracted vehicle identifier to secondary vehicle identifiers for each order. If a vehicle is identified as not associated with an open order, the method 200 proceeds to step 114 of method 100. If a vehicle is not a secondary vehicle associated with an open order, the method 200 proceeds to step 212. In some embodiments, the method 200 proceeds to step 212 after identifying a single match between the extracted vehicle identifier and a secondary vehicle identifier of a user profile. In other embodiments, the extracted vehicle identifier is compared to each user profile associated with an order in the order database 34 and can be associated with multiple orders in the order database 34 during step 210.

At optional step 212, the vehicle identification system 28 provides an extracted vehicle identifier to the retail system 30 and indicates that an unmatched vehicle is located in the designated pick-up area. The retail system 30 may notify an employee and/or automated system to allow order information to be obtained from the operator of the unmatched vehicle. Further, as discussed in more detail below, the retail system 30 may update one or more user profiles to include the unmatched vehicle identifier as a secondary vehicle identifier associated with a first user.

In some embodiments, an unmatched vehicle arrives to pick-up an order. For example, in some embodiments, an individual may purchase a new vehicle without updating primary and/or secondary vehicle identifiers and/or may designate a new individual to pick-up an order. In some embodiments, the retail system 30 is configured to update a user profile to include secondary vehicle information for secondary vehicles identified at the retail location.

In some embodiments, a status manager 256 is configured to monitor the status of each element in the vehicle recognition system 28 and/or the imaging devices 32a-32c. The status manager 256 is configured to verify the operational status of each element. If one or more elements fail, the status manager 256 may generate a notification to the retail system 30 indicating that automatic vehicle recognition and order association is not operational due to the failure. In other embodiments, the status manager 256 may modify one or more elements, such as the vehicle recognizer 254, to utilize alternative information, for example, to ignore image input from an imaging device 32a identified as being in a non-operational state.

Figure 7:
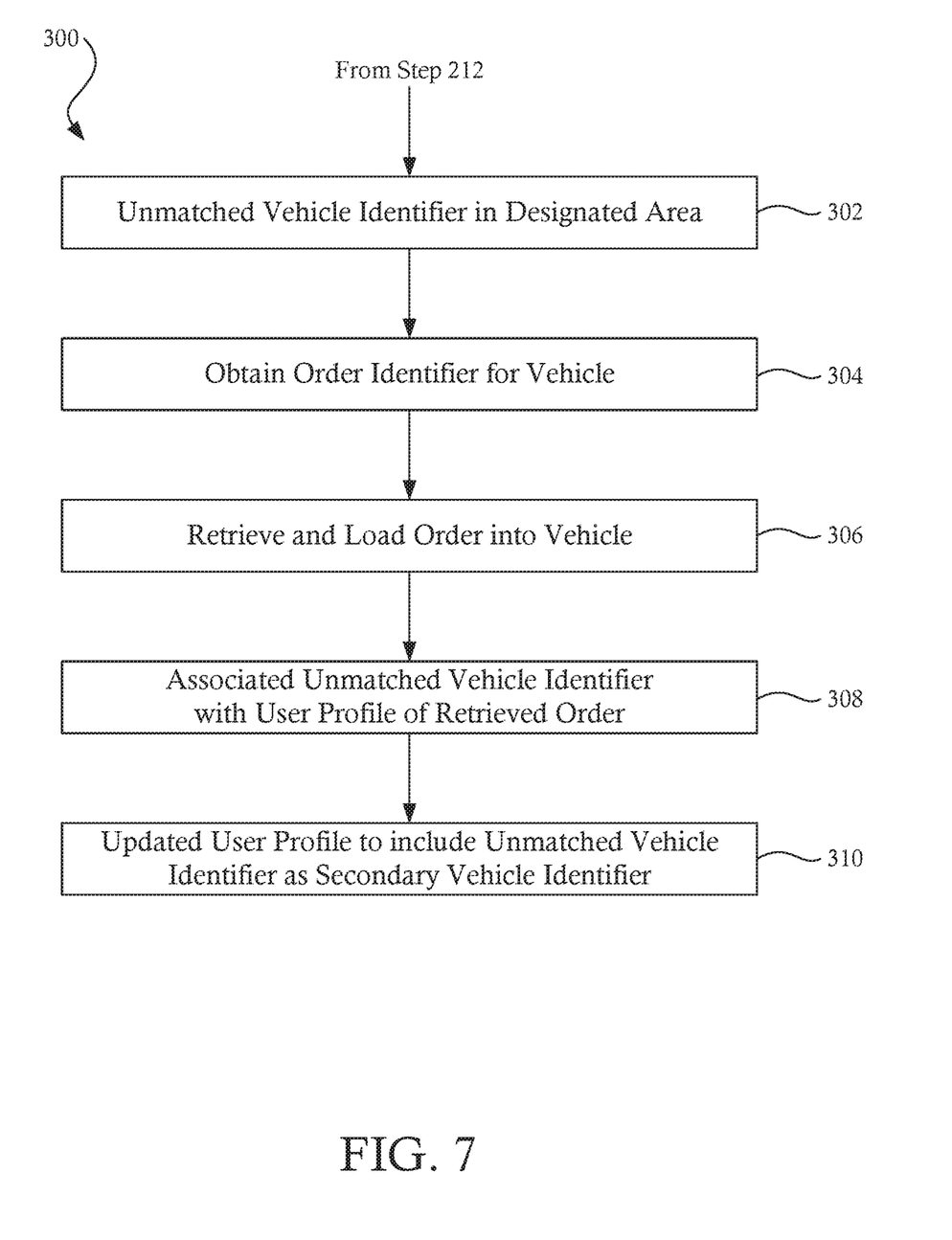
FIG. 7 is a flowchart illustrating a method of associating a vehicle with a user profile, in accordance with some embodiments.

FIG. 7 illustrates a method 300 of associating an unmatched vehicle identifier with a user profile, in accordance with some embodiments. At step 302, an unmatched vehicle identifier is extracted from a vehicle within the designated pick-up area of a retail location. As discussed above, an unmatched vehicle identifier is a vehicle identifier that does not match a primary vehicle identifier or a secondary vehicle identifier of any user profile associated with an order in the order database 34. For example, in some embodiments, the extracted vehicle identifier is not associated with any user profile maintained by the e-commerce environment 160. In other embodiments, the extracted vehicle identifier matches a primary and/or secondary vehicle identifier in at least one user profile maintained by the e-commerce environment 160, but the at least one user profile does not have an order in the order database 34. In some embodiments, the unmatched vehicle identifier may be identified according to the method 200 discussed above.

At step 304, an employee and/or automated system interacts with the vehicle and/or an operator of the vehicle to identify at least one order for pick-up. For example, in some embodiments, an employee of the retail location may interact with a driver of the vehicle to receive an order number and/or confirmation number associated with the order. In other embodiments, the driver of the vehicle may interact with an automated pick-up interface configured to allow input of the order number and/or confirmation number. In some embodiments, additional information regarding the vehicle and/or the operator of the vehicle may be requested by the employee and/or automated system.

At step 306, the order is retrieved from the order staging area and loaded into the unmatched vehicle. At step 308, a user profile for the order is identified and the unmatched vehicle identifier is associated with the user profile. For example, in some embodiments, the vehicle identification system 28 extracts a vehicle identifier, such as a license plate number. The license plate number is associated with the user profile of the order identified by the employee and/or automated pick-up interface using the order number. In other embodiments, an employee of the retail location may manually associate the unmatched vehicle identifier of the vehicle with the user profile.

After a predetermined number of order pick-ups, at step 310, the unmatched vehicle identifier is added to the user profile as a secondary vehicle identifier. For example, in some embodiments, a single order pick-up causes the e-commerce environment 160 to update a user profile with the unmatched vehicle identifier as a secondary vehicle identifier. In other embodiments, a greater number of order pick-ups (such as 2, 3, etc.) must be recorded before the unmatched vehicle identifier is added as a secondary vehicle identifier for the user profile. In some embodiments, a verification message may be generated and sent to a user device 24a associated with the user profile prior to adding an unmatched vehicle identifier as a secondary vehicle in the user profile.

In some embodiments, a set of vehicles (or vehicle identifiers) may be excluded from being associated as secondary vehicles with a user profile. For example, in some embodiments, a list of public vehicles (e.g., taxis, rideshare vehicles, buses, rental vehicles, etc.) may be maintained and excluded from being secondary vehicles, as such vehicles are likely to be used by multiple individuals for picking up orders associated with unrelated user profiles. In other embodiments, a user may designate one or more vehicles that are excluded from being associated with the user profile.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system, comprising:
a memory having instructions stored thereon, and a processor configured to read the instructions to:
receive imaging data from at least one imaging device configured to provide a field-of-view of a predetermined area associated with a retail location;
extract, using an image recognition process, a vehicle identifier for a vehicle within the image data;
compare the extracted vehicle identifier to a first identifier associated with a primary vehicle for an order in a set of orders associated with the retail location;
determine that the extracted vehicle identifier does not match the first identifier associated with the primary vehicle and the order;
compare, in response to determining that the extracted vehicle identifier does not match the first identifier, the extracted vehicle identifier to a second identifier associated with a secondary vehicle and the order;
determine whether the extracted vehicle identifier matches the second identifier associated with the secondary vehicle and the order; and
associate, in response to determining the extracted vehicle identifier matches the second identifier, the vehicle with the order;
wherein prior to associating the vehicle with the order, the processor is configured to read the instructions to:
identify the extracted vehicle identifier as being associated with an unmatched vehicle, wherein the unmatched vehicle is a vehicle not associated with an open order;
receive an order identifier associated with the order; and
associate the unmatched vehicle with a user profile associated with the order identifier, wherein the unmatched vehicle is designated as the secondary vehicle in the user profile and the extracted vehicle identifier is stored as the second identifier associated with the secondary vehicle after a predetermined number of order pick-ups have been recorded, wherein the predetermined number is 2 or greater;
wherein the processor is further configured to read the instructions to:
verify an operational state of the at least one imaging device; and
modify an operation based, at least in part, on the verification of the operational state of the at least one imaging device, wherein modifying the operation includes ignoring imaging input from the at least one imaging device identified as being in a non-operational state and utilizing alternative information for the image recognition process.

2. The system of claim 1, wherein the processor is configured to read the instructions to:
generate a staging notification for the order, wherein the staging notification is generated prior to receiving imaging data;
generate a loading notification after the vehicle is associated with the order.

3. The system of claim 1, wherein the image recognition process comprises an automated license plate recognition process.

4. The system of claim 1, wherein the at least one imaging device comprises a plurality of imaging devices, wherein processor is configured to read the instructions to receive an indication of a status of each of the plurality of imaging devices, and wherein the processor is configured to read the instructions to extract the vehicle identifier from a set imaging devices having a first indication of status.

5. The system of claim 1, wherein the processor is configured to read the instructions to:
   determine that the extracted vehicle identifier matches the first identifier associated with the primary vehicle and the order; and
   associate, in response to determining the extracted vehicle identifier matches the first identifier, the vehicle with the order.

6. The system of claim 1, wherein prior to associating the vehicle with the order, the processor is configured to read the instructions to:
   identify the extracted vehicle identifier as being associated with an unmatched vehicle;
   receive an order identifier associated with the order; and
   associate the unmatched vehicle with a user profile associated with the order identifier.

7. The system of claim 6, wherein the processor is configured to read the instructions to:
   receive, in a subsequent order pick-up, imaging data from the at least one imaging device of the predetermined area;
   extract, using the image recognition process, the vehicle identifier for the vehicle within the image data;
   identify, in the subsequent order pick-up, the extracted vehicle identifier as being associated with the unmatched vehicle;
   receive a second order identifier associated with the user profile and a second order in the set of orders; and
   associate the unmatched vehicle with the user profile, wherein, in response to the unmatched vehicle being associated with the user profile, the first order, and the second order, the unmatched vehicle is designated as the secondary vehicle in the user profile, and the extracted vehicle identifier is stored as the second identifier associated with the secondary vehicle.

8. The system of claim 1, wherein the processor is configured to read the instructions to:
   extract a second vehicle identifier for a second vehicle within the image data;
   determine that the second vehicle associated with the extracted second vehicle identifier is excluded from being associated as the secondary vehicle with a user profile; and
   exclude the extracted second vehicle identifier from being associated as the secondary vehicle.

9. A non-transitory computer readable medium having instructions stored thereon, wherein the instructions, when executed by a processor cause a device to perform operations comprising:
   receiving imaging data from at least one imaging device configured to provide a field-of-view of a predetermined area associated with a retail location;
   extracting, using an image recognition process, a vehicle identifier for a vehicle within the image data;
   comparing the extracted vehicle identifier to a first identifier associated with a primary vehicle for an order in a set of orders associated with the retail location;
   determining that the extracted vehicle identifier does not match the first identifier associated with the primary vehicle and the order;
   comparing, in response to determining that the extracted vehicle identifier does not match the first identifier, the extracted vehicle identifier to a second identifier associated with a secondary vehicle and the order;
   determining whether the extracted vehicle identifier matches the second identifier associated with the secondary vehicle and the order; and
   associating, in response to determining the extracted vehicle identifier matches the second identifier, the vehicle with the order;
   wherein prior to associating the vehicle with the order, the instructions cause the device to perform further operations comprising:
      identifying the extracted vehicle identifier as being associated with an unmatched vehicle, wherein the unmatched vehicle is a vehicle not associated with an open order;
      receiving an order identifier associated with the order; and
      associating the unmatched vehicle with a user profile associated with the order identifier, wherein the unmatched vehicle is designated as the secondary vehicle in the user profile and the extracted vehicle identifier is stored as the second identifier associated with the secondary vehicle after a predetermined number of order pick-ups have been recorded, wherein the predetermined number is 2 or greater;
   wherein the instructions cause the device to perform further operations comprising:
      verifying an operational state of the at least one imaging device; and
      modifying an operation based, at least in part, on the verification of the operational state of the at least one imaging device, wherein modifying the operation includes ignoring imaging input from the at least one imaging device identified as being in a non-operational state and utilizing alternative information for the image recognition process.

10. The non-transitory computer readable medium of claim 9, wherein the instructions cause the device to perform operations comprising:
    generating a staging notification for the order, wherein the staging notification is generated prior to receiving imaging data;
    generating a loading notification after the vehicle is associated with the order.

11. The non-transitory computer readable medium of claim 9, wherein the image recognition process comprises an automated license plate recognition process.

12. The non-transitory computer readable medium of claim 9, wherein the at least one imaging device comprises a plurality of imaging devices, wherein the instructions cause the device to perform operations comprising:
    receiving an indication of a status of each of the plurality of imaging devices, and
    extracting the vehicle identifier from a set imaging devices having a first indication of status.

13. A method, comprising:
    receiving imaging data from at least one imaging device configured to provide a field-of-view of a predetermined area associated with a retail location;
    extracting, using an image recognition process, a vehicle identifier for a vehicle within the image data;
    comparing the extracted vehicle identifier to a first identifier associated with a primary vehicle for an order in a set of orders associated with the retail location;
    determining that the extracted vehicle identifier does not match the first identifier associated with the primary vehicle and the order;
    comparing, in response to determining that the extracted vehicle identifier does not match the first identifier, the extracted vehicle identifier to a second identifier associated with a secondary vehicle and the order;

determining whether the extracted vehicle identifier matches the second identifier associated with the secondary vehicle and the order; and associating, in response to determining the extracted vehicle identifier matches the second identifier, the vehicle with the order;

wherein prior to associating the vehicle with the order, identifying the extracted vehicle identifier as being associated with an unmatched vehicle, wherein the unmatched vehicle is a vehicle not associated with an open order;

receiving an order identifier associated with the order;

associating the unmatched vehicle with a user profile associated with the order identifier, wherein the unmatched vehicle is designated as the secondary vehicle in the user profile and the extracted vehicle identifier is stored as the second identifier associated with the secondary vehicle after a predetermined number of order pick-ups have been recorded, wherein the predetermined number is 2 or greater;

verifying an operational state of the at least one imaging device; and modifying an operation based, at least in part, on the verification of the operational state of the at least one imaging device, wherein modifying the operation includes ignoring imaging input from the at least one imaging device identified as being in a non-operational state and utilizing alternative information for the image recognition process.

14. The method of claim 13, comprising:

generating a staging notification for the order, wherein the staging notification is generated prior to receiving imaging data;

generating a loading notification after the vehicle is associated with the order.

15. The method of claim 13, wherein the image recognition process comprises an automated license plate recognition process.

* * * * *